US010264767B2

United States Patent
Jung et al.

(10) Patent No.: US 10,264,767 B2
(45) Date of Patent: Apr. 23, 2019

(54) MULTI-LEVEL APARTMENT TYPE THREE-DIMENSIONAL WATER TANK

(71) Applicant: REPUBLIC OF KOREA(NATIONAL FISHERIES RESEARCH AND DEVELOPMENT INSTITUTE), Busan (KR)

(72) Inventors: Min-Min Jung, Jeju-do (KR); Tae-Seok Moon, Jeju-do (KR); Seok-Jung Han, Jeju-do (KR); Hong-In Song, Gyeonggi-do (KR); Jae-U Kim, Jeju-do (KR)

(73) Assignee: NATIONAL FISHERIES RESEARCH AND DEVELOPMENT INSTITUTE, Busan (KR)

( * ) Notice: Subject to any disclaimer, the term of this patent is extended or adjusted under 35 U.S.C. 154(b) by 215 days.

(21) Appl. No.: 15/117,398

(22) PCT Filed: Jun. 4, 2015

(86) PCT No.: PCT/KR2015/005596
§ 371 (c)(1),
(2) Date: Aug. 8, 2016

(87) PCT Pub. No.: WO2015/186978
PCT Pub. Date: Dec. 10, 2015

(65) Prior Publication Data
US 2017/0071142 A1    Mar. 16, 2017

(30) Foreign Application Priority Data

Jun. 5, 2014 (KR) .................. 10-2014-0068229
Jun. 5, 2014 (KR) .................. 10-2014-0068237
Jun. 5, 2014 (KR) .................. 10-2014-0068260

(51) Int. Cl.
*A01K 63/00* (2017.01)
*A01K 63/06* (2006.01)
*A01K 63/04* (2006.01)

(52) U.S. Cl.
CPC ............ *A01K 63/06* (2013.01); *A01K 63/003* (2013.01); *A01K 63/045* (2013.01); *Y02P 60/642* (2015.11)

(58) Field of Classification Search
CPC .... A01K 63/06; A01K 63/003; A01K 63/045; A01K 63/00; A01G 9/022; A01G 9/023
See application file for complete search history.

(56) References Cited

U.S. PATENT DOCUMENTS 4,147,131 A * 4/1979 Walker ................. A01K 63/003
119/246
5,251,399 A * 10/1993 Rasmussen ............ A01G 9/023
211/88.03

(Continued)

FOREIGN PATENT DOCUMENTS

JP    2007082512    4/2007
KR    100735830    6/2007

(Continued)

*Primary Examiner* — Monica L Williams
(74) *Attorney, Agent, or Firm* — IPLA P.A.; James E. Bame (57) ABSTRACT

Provided is a multi-level apartment type three-dimensional water tank, partitioned in front, rear, left and right directions in a multi-level structure and provided with a water tank sill support having an open top surface to accommodate the lower part of modular glass water tanks. The present multi-level apartment type three-dimensional water tank solves a problem such that the modular glass water tank made from glass or synthetic resin such as acryl can break due to slipping, which is caused by weak frictional force between the modular glass water tank and a bottom surface on which the modular glass water tank is provided, and facilitates the (Continued)

installation and separation of the three dimensional water tank and each modular glass water tank. The present water tank also makes it possible to recycle into nutritional contents needed for the growth of plants, organic and inorganic substances present as sources of pollution.

14 Claims, 9 Drawing Sheets

(56) References Cited

U.S. PATENT DOCUMENTS

| | | | | |
|---|---|---|---|---|
| 5,469,810 A * | 11/1995 | Chiang | ............... | A01K 63/003 119/225 |
| 6,840,008 B1 * | 1/2005 | Bullock | ............... | A01G 9/023 47/82 |
| 2010/0072102 A1 * | 3/2010 | Jung | ............... | A01G 9/023 206/503 |
| 2013/0145690 A1 * | 6/2013 | Cannon | ............... | A01G 9/023 47/66.7 |
| 2013/0152468 A1 * | 6/2013 | Huang | ............... | A01G 9/022 47/82 |
| 2013/0206077 A1 * | 8/2013 | Castranova | ............... | A01K 1/03 119/217 |
| 2014/0251932 A1 * | 9/2014 | Lutz | ............... | A01K 63/003 211/85.26 |
| 2015/0313104 A1 * | 11/2015 | Cottrell | ............... | A01G 22/00 47/62 A |
| 2016/0050893 A1 * | 2/2016 | Lari | ............... | A01K 63/003 119/248 |

FOREIGN PATENT DOCUMENTS

| | | |
|---|---|---|
| KR | 20130017139 | 2/2013 |
| KR | 101270631 | 6/2013 |

* cited by examiner

MULTI-LEVEL APARTMENT TYPE THREE-DIMENSIONAL WATER TANK

BACKGROUND

The present invention relates to a multi-level apartment type three-dimensional water tank composed of modular glass water tanks mounted in four surfaces in front, rear, left and right directions in a plurality of layers, aimed at intensive breeding and management of various fish species providing adequate breeding environment for each fish species. In addition, a water tank sill support is mounted at a lower part of each modular glass water tank configuring the multi-level apartment type three-dimensional water tank in order to stably fix each modular glass water tank to the multi-level apartment type three-dimensional water tank. And the present multi-level apartment type three-dimensional water tank is equipped with an aquaponics system wherein culture water used for aquaculture is recycled as nutrient water for plants.

In line with development of aquaculture technologies, fish breeding technologies using land based water tanks instead of fish farms in the sea are current in use and further aquaculture in an enclosed establishment in urban area appear wherein a variety of fish and crustaceans species are separately cultured in each layer and each water tank in an establishment.

In general, the aquaculture using seawater is divided into inland water tank type and offshore fish farm type. The inland water tank type is to transfer target organisms from the sea to the land-based water tank which can be artificially controlled in its habitat where the organisms are probably exposed to more natural and unpredictable conditions. Meanwhile, the offshore fish farm type is to grow target organisms in offshore installations such as floating cages or netting built in a natural body of seawater.

When the fishery or shellfish are grown in floating cages in the sea since the time that they are still whitebait or spat, the time for them to be exposed to the risk of natural disasters becomes longer, dropping the yield. So the recent trend is that the whitebait or spat is cultured in land-based aquacultures until they grow in a predetermined size in a highly populated condition, and then they are transferred to floating cages in the sea to grow further into adult organisms with more commercial values.

With this purpose, land-based aquaculture is equipped with culture water supply and drainage facilities, treatment facilities, and oxygen supply facilities in order to create an optimal environment for the growth of marine species in a predetermined size so as to protect marine species.

On the other hand, the water tank used for the high density aquaculture is to be designed as a multi-layer structure basically, wherein the material of the tank is synthetic resin or glass rather than concrete in order to use limited breeding area efficiently.

However, the use of glass or synthetic resin like acrylic, which is basically thin, as a material of the water tank makes it difficult to design the water tank bottom portion on which a water discharging apparatus composed of interior and outer pipes for adjusting water level of culture water is to be mounted. The multi-layer structure currently is composed of separate compartments in a layer having the same environment so that one or two species can be cultured therein.

Therefore, there is a need for a tank system which is equipped with tank compartments in a plurality of layers for using the plurality of layers efficiently, wherein a variety of aquaspecies can be accommodated and the environment for the species in each compartment can be controlled to be suitable for the species.

On the other hand, supply and drainage of culture water in multi-level apartment type three dimensional water tank is made in such a way that new culture water is supplied and discharged. Since high density population of fish species are accommodated in a tank, as time elapses, nutrients such as phosphorus and nitrate flow in causing eutrophication resulting that culture water quality is deteriorated and a lot of costs is needed to deal with it. In practice, due to the lack of normal wastewater treatment facilities, wastewater is discharged into rivers and underground causing environmental pollution.

There are chemical methods and physical methods as conventional methods of improving culture water quality. In chemical methods, chemicals such as photosynthesis inhibitor, herbicides, etc. are introduced to inhibit the growth of algae and coagulants are injected to deposit sediment. However, in order to maintain the drug effect, chemicals need to be introduced periodically. And due to those chemicals, the species in fish tanks cannot grow appropriately and food safety cannot be ensured.

As one of physical methods, filtering algae with circulation of culture water by means of a filter generates a lot of costs for frequent exchange of expensive filters. As another physical method, building facilities for coagulation, sedimentation, and filtration wherein the waste is coagulated with polymer coagulant, and coagulated and precipitated debris is dehydrated in a filtration plant, requires a large area to install the facilities, considerable initial investment, and continuous operating costs.

In order to solve the problems stated above, the present invention provides multi-level apartment type three dimensional water tank in which lower parts of modular glass water tanks installed in a multi level three dimensional structure are mounted on a water tank sill support of which the upper part is open. Using the present water tank, culture water including organic material generated in fish culture is filtrated or purified in a ecofriendly manner and ecofriendly aquaponics for plant growing is also facilitated in this treatment process.

SUMMARY OF THE INVENTION

Provided is a multi-level apartment type three-dimensional water tank, partitioned in front, rear, left and right directions in a multi-level structure and provided with a water tank sill support having an open top surface to accommodate the lower part of modular glass water tanks, thereby increasing clamping force of the water tanks. The present multi-level apartment type three-dimensional water tank makes it possible to recycle into nutritional contents needed for the growth of plants, organic and inorganic substances present as sources of pollution in culture water which are generated when fish is cultured, so as to decompose eutrophic substances interrupting the cultivation of fish in a plant cultivation step, thereby absorbing the decomposed substances as nutrients.

The present invention relates to a multi-level apartment type three-dimensional water tank, characterized in that one or more than one modular structures as horizontal members are stacked surrounding four surfaces of a vertical member, the vertical member composed of a hollow polygonal frame which is open in the upper and lower part; that one or more than one modular water tanks are mounted on the horizontal members in front, back, left and right surfaces with the vertical member in the middle; and that a system controller is installed on the upper opening part of the polygonal frame.

The modular water tank comprises: a water tank body having an upper opening, a bottom part with a predetermined area, and a polygonally shaped water tank outer wall; a drain-through hole for discharging culture water formed on an edge surface in contact with outer wall of the water tank body; a water discharging line formed at the outer portion of the drain-through hole; and a double drainage apparatus comprising a water level control pipe, and a drain pipe surrounding the outer surface with a predetermined distance with the water level control pipe at the lower end of the water level control pipe, which is connected to the lateral edge wall inside the modular water tank.

A bump of a predetermined height is formed on an outer edge of upper surface of the horizontal member where modular water tanks are mounted, so that the modular water tank is stably mounted inside of the bump without slipping out of the horizontal member. In another embodiment of invention, a water tank sill support is engaged on the lower part of the modular water tank, the water tank sill support having an open upper part and a predetermined height to accommodate the modular water tank.

A protrusion-type frame is formed on a lower edge surface of the water tank sill support. A surface of the water tank sill support has a concave groove to surround the bump of the horizontal member and is fixed in engagement with the bump. The opposite surface has a protruding frame so as to protrude to the lower side of the rear surface of the horizontal member to be fixed in connection. And a drawer-type pulling handle is formed in which, for a surface of a water tank sill support to wrap a bump of the horizontal member, a protruding frame is formed protruding toward a lower surface of the bump.

In a part connecting the horizontal member and the vertical member, a water discharging part concave in the lower part thereof is formed, in which filter media and filter cotton are laid out where water plants are sown. The water discharging part, connected surrounding the vertical member, comprises an open upper part having a plate-shaped horizontal frame and vertical frame engaged therewith and a concave lower part, so as to have a stair-shaped form which is wide in the upper part and narrow in the lower part.

A main reservoir for supplying culture water to modular water tanks is formed in the upper part of the vertical member composed of a polygonal frame, and a main reservoir line including a flow meter measuring flux flow of culture water and water exchange rate is installed on the main reservoir. The culture water for aquaponics is supplied to the modular water tanks through a main reservoir line of the main reservoir, transferred to the water discharging part through water discharging line of the modular water tank, supplied to the plants in the aquaponics system, and then transferred through a drain-through hole to the filtration tank to be purified to be rotationally supplied.

The present invention relates to a multi-level apartment type three dimensional water tank composed of modular glass water tanks mounted in every surface in front, rear, left, right, upward and downard directions in a plurality of layers, aimed at intensive breeding and management of various fish species providing adequate breeding environment of each fish species. The present multi-level apartment type three-dimensional water tank solves a problem in which the glass water tank made from glass or synthetic resin such as acryl can break due to slipping which is caused by weak frictional force between modular glass water tanks and a bottom surface on which the modular glass water tank is provided, and facilitates the installation and separation of the three dimensional water tank and the glass water tanks. The present water tank also makes it possible to recycle into nutritional contents needed for the growth of plants, organic and inorganic substances present as sources of pollution in culture water which are generated when fish is cultured, so as to decompose eutrophic substances interrupting the cultivation of fish in a plant cultivation process, thereby absorbing the decomposed substances as nutrients. Overall, the present water tank filtrates and purifies culture water in ecofriendly manner, helps establish an yearly sustainable organic agricultural product and fishery product production, and the inner space of the water tank can be efficiently used.

BRIEF DESCRIPTION OF THE DRAWINGS

FIG. 1 is a perspective view of a multi-level apartment type three dimensional water tank. (FIG. 1 is the same as FIG. 1 in Korea Patent Application No. 10-2014-68229).

FIG. 2 is a perspective view of a modular structure of a multi-level apartment type three dimensional water tank. (FIG. 2 is the same as FIG. 2 in Korea Patent Application No. 10-2014-68229).

FIG. 3 shows Type A and Type B depending on the installation position of a filtration tank of the multi-level apartment type three dimensional water tank. (FIG. 3 is the same as FIG. 3 in Korea Patent Application No. 10-2014-68229).

FIG. 4 shows a cross-sectional view of a water discharging part of a water quality controlling part of the multi-level apartment type three dimensional water tank. (FIG. 4 is the same as FIG. 4 in Korea Patent Application No. 10-2014-68229).

FIG. 5 shows a drain hole of a water discharging part of the multi-level apartment type three dimensional water tank. (FIG. 5 is the same as FIG. 5 in Korea Patent Application No. 10-2014-68229).

FIG. 6 shows the variations of the drip tray drainage structure of the multi-level apartment type three dimensional water tank. (FIG. 6 is the same as FIG. 6 in Korea Patent Application No. 10-2014-68229).

FIG. 7 shows a shelf brace of a water discharging part of the multi-level apartment type three dimensional water tank. (FIG. 7 is the same as FIG. 7 in Korea Patent Application No. 10-2014-68229).

FIG. 8 shows a photo of a modular glass water tank of the multi-level apartment type three dimensional water tank. (FIG. 8 is the same as FIG. 8 in Korea Patent Application No. 10-2014-68229).

FIG. 9 is a perspective view of a modular glass water tank of the multi-level apartment type three-dimensional water tank. (FIG. 9 is the same as FIG. 4 in Korea Patent Application No. 10-2014-68260).

FIG. 10 shows a filtration apparatus of the multi-level apartment type three-dimensional water tank. (FIG. 10 is the same as FIG. 9 in Korea Patent Application No. 10-2014-68229).

FIG. 11 shows a filter and a filter retainer of the multi-level apartment type three-dimensional water tank. (FIG. 11 is the same as FIG. 10 in Korea Patent Application No. 10-2014-68229).

FIG. 12 is a perspective view of a modular glass water tank mounted with a water tank sill support of the multi-level apartment type three-dimensional water tank. (FIG. 12 is the same as FIG. 5 in Korea Patent Application No. 10-2014-68260).

FIG. 13 shows a water tank sill support of the multi-level apartment type three dimensional water tank. (FIG. 13 is the same as FIG. 6 in Korea Patent Application No. 10-2014-68260).

FIG. 14 shows a Type A which is a variation of the water tank sill support of the multi-level apartment type three-dimensional water tank. (FIG. 14 is the same as FIG. 7 in Korea Patent Application No. 10-2014-68260).

FIG. 15 shows a Type B which is a variation of the water tank sill support of the multi-level apartment type three-dimensional water tank. (FIG. 15 is the same as FIG. 8 in Korea Patent Application No. 10-2014-68260).

FIG. 16 shows a Type C which is a variation of the water tank sill support of the multi-level apartment type three-dimensional water tank. (FIG. 16 is the same as FIG. 9 in Korea Patent Application No. 10-2014-68260).

FIG. 17 is an overall perspective view and a cross-sectional view of a unit of the multi-level apartment type three-dimensional water tank. (FIG. 17 is the same as FIG. 13 in Korea Patent Application No. 10-2014-68229).

FIG. 18 shows a principle of multi-layer combination of a unit of the multi-level apartment type three-dimensional water tank. (FIG. 18 is the same as FIG. 14 in Korea Patent Application No. 10-2014-68229).

DETAILED DESCRIPTION OF THE INVENTION

Hereinafter, the detailed structure of the multi-level apartment type three dimensional water tank is explained with reference to the accompanying drawings.

Figure 1:
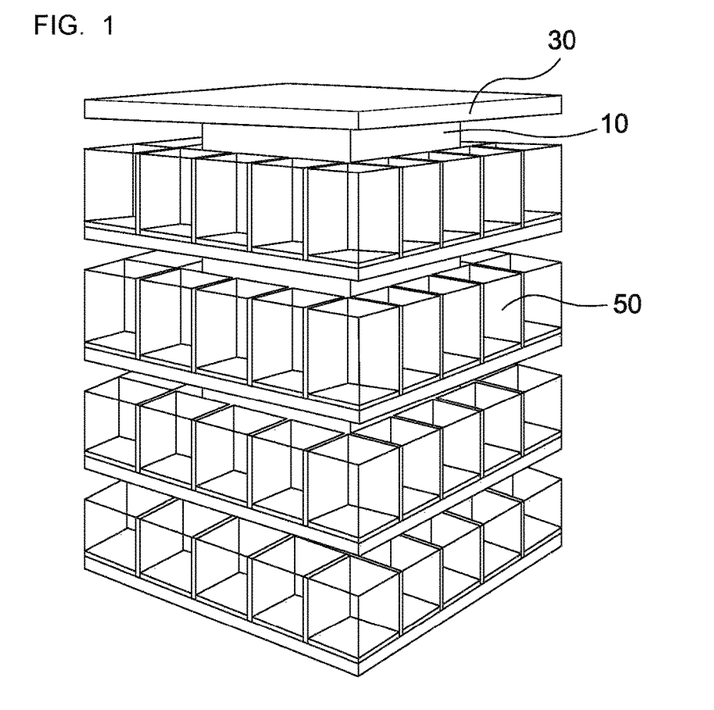

FIG. 1 is a perspective view of a multi-level apartment type three dimensional water tank. The present multi-level apartment type three dimensional water tank comprises a vertical member composed of a hollow hexahedronal frame which is open in the upper and lower part; a system controller (30) having a control function installed on the upper part of the vertical member; one or more than one plate-shaped frames engaged with the vertical member in the respective layer; and modular water tanks (50) mounted on the vertical member in front and rear, left and right, and upward and downward directions, wherein four layers and 64 modular glass water tanks are installable.

Each layer of the present multi-level apartment type three dimensional water tank is divided into one structure unit layers, and in each layer, one or more than one glass water tanks are partitioned into a respective unit, and the unit of each layer is automatically connected to a system controller. Thus each different environmental control for each tank in each layer is facilitated, and even in a tank, a variety of fish species can be cultured by differentiating the water tank condition. So it can be used in an aquarium requiring intensive management or in a laboratory in need of environmental control in various conditions.

In four surface structure in front and rear, left and right directions, up to 5 modular water tanks are installed in one surface and also installed in upward and downward directions in a multi-layer manner, which allows intensive culture management while efficiently using the space, and facilitates adjustment of the size of each modular water tank to make it suitable for interior design objective.

In particular, in case of the species-specific breeding experiments in a laboratory, the ease in setting and management of experimental conditions is the most important. The adequate number of modular water tanks for an individual researcher to control experimental conditions and analyze the data therefrom is preferably up to 64 modular water tanks in 4 layer structure consisting of 5 water tanks in each surface.

Figure 2:
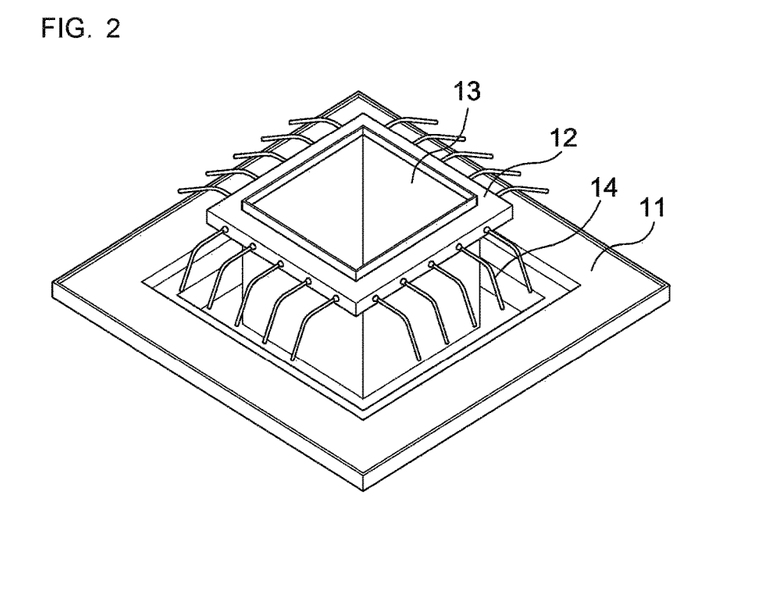

FIG. 2 is a perspective view of a modular structure of a multi-level apartment type three dimensional water tank. The structure unit (10) comprises a filtration tank (13) of a hollow cuboidal vertical member structure similar to a pipe with open upper and bottom ends; a main reservoir (12) surrounding the center of the cuboidal frame; and a water discharging part (11) of a stair-type structure which is wide in the upper part and narrow in the lower part and made up with a plurality of plate-shape frames, the water discharging part installed on the lower part of the filtration tank.

A main reservoir (12) is formed in a hollow cuboidal frame wherein an upper portion of the filtration tank penetrates through the center of the main reservoir so as to surround the main reservoir, and a main reservoir line (14) formed on the outer wall surface of the main reservoir supplies clean culture water stored in the interior portion of the main reservoir frame to the glass water tank.

The main reservoir line (14) is composed of a pipe of plastic or metal material and may be mounted with a valve to supply and control clean culture water stored in the interior portion of the main reservoir. The valve may be of a manual valve or may be configured as a solenoid valve electrically connected to the automatic control part to facilitate mechanical control. A flow meter can be attached to the main reservoir line to enable to measure flux flow and water exchange rate, making it possible to measure how concentration of toxin in a liquid changes along with liquid flow rate depending on environmental conditions set in a laboratory.

Figure 3:
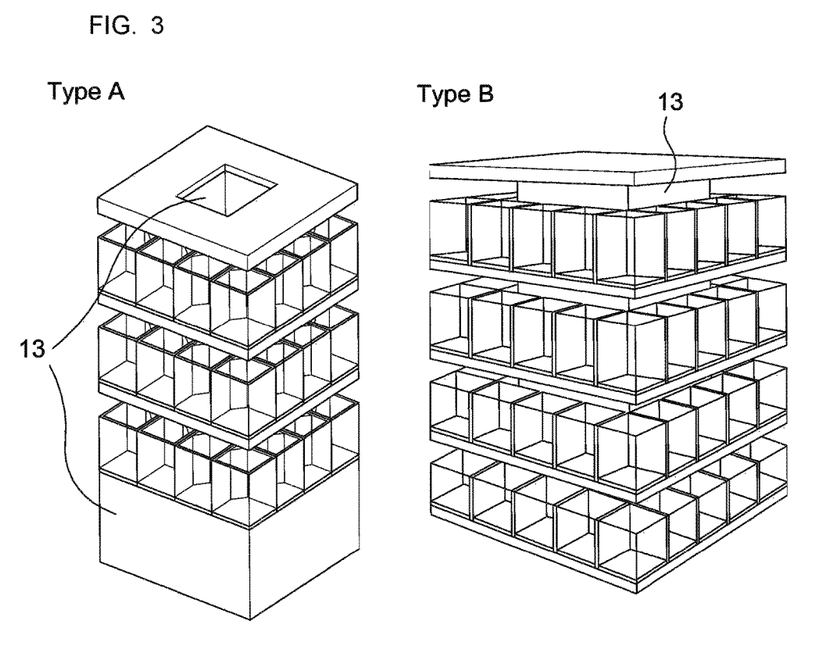

FIG. 3 shows Type A and Type B divided depending on the installation position of a filtration tank of the multi-level apartment type three dimensional water tank. The filtration tank (13) can be divided into Type A and Type B in examples. In Type A, the filtration tank (13) can be installed in the center of the water tank and the lower part of the water tank respectively and be varied in the number and locations thereof. In Type B, the filtration tank can be installed only in the center of the water tank.

First, Type B is suitable to be used in breeding of fish species not requiring highly developed purification capability wherein culture water requiring cleansing and filtering is transferred to the filtration tank installed in the center of the glass water tank through a drain hole.

On the other hand, when the highly improved purification capability is necessary like the case of culture water resulting from experiments including toxins, Type A is more suitable. Type A can generate highly purified culture water via a secondary process where culture water having passed through a primary process goes through a filtration tank installed at the bottom part in addition to the primary process where culture water is transferred to the filtration tank installed at the center and purified therein as in Type B.

Figure 4:
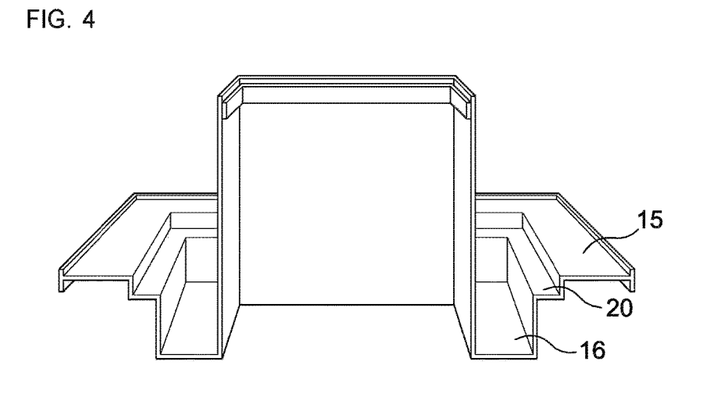

FIG. 4 shows a cross-sectional view of a water discharging part of a water quality controlling part of the multi-level apartment type three dimensional water tank. The water discharging part (11) of the present invention comprises a drip tray (16) of a plate-shape frame, a connection plate (20), and a water discharging part shelf (15) connected in sequence in a stair-shape structure which is wide in the upper part and narrow in the lower part. When viewed from the front surface, the entire frame of the water discharging part is in an enclosed shape surrounding the center forming a stair structure, and is in a rectangular structure hollow in the middle when viewed from the upper surface.

The drip tray (16) is made of a vertical frame and a horizontal frame in a board shape. The horizontal frame is connected to the lower part of the filtration tank so that the drip tray seems like "⌴" in its shape and is installed on a left and a right side of a filtration tank.

The vertical frame of the drip tray and the filtration tank are provided in parallel and the horizontal frame of the drip tray is connected therebetween so as to configure a hollow space concave in the lower part and open in the upper part, collecting the waste culture water discharged from the glass water tank and discharging outside. The horizontal frame of the drip tray may be configured with a drain hole (19) which is a through hole having a constant diameter which can move collected culture water to the outside or the filtration tank.

Figure 5:
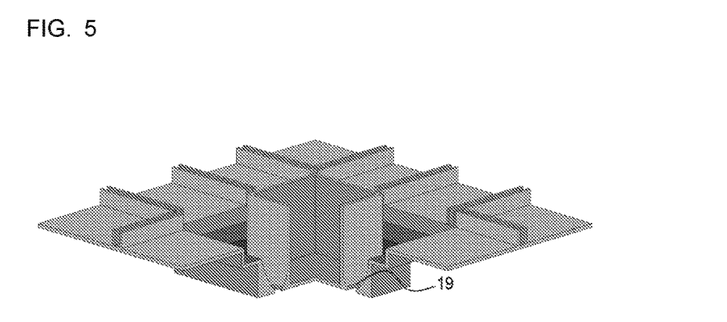

FIG. 5 shows a drain hole of the water discharging part of the multi-level apartment type three dimensional water tank. When culture water collected in the edge where the upper frame and lower frame of the drip tray meet is not discharged for a long time, odor is generated by the nutrients contained in the culture water. To solve this problem, according to the present invention, the number or location of the drain hole may be easily adjusted and the drip tray frame can be also modified into a structure where culture water can be easily discharged through the drain hole. As a basic embodiment of the invention, the drip tray frame has 1-5 degree gradient inclining toward the drain hole to ease water drainage.

Figure 6:
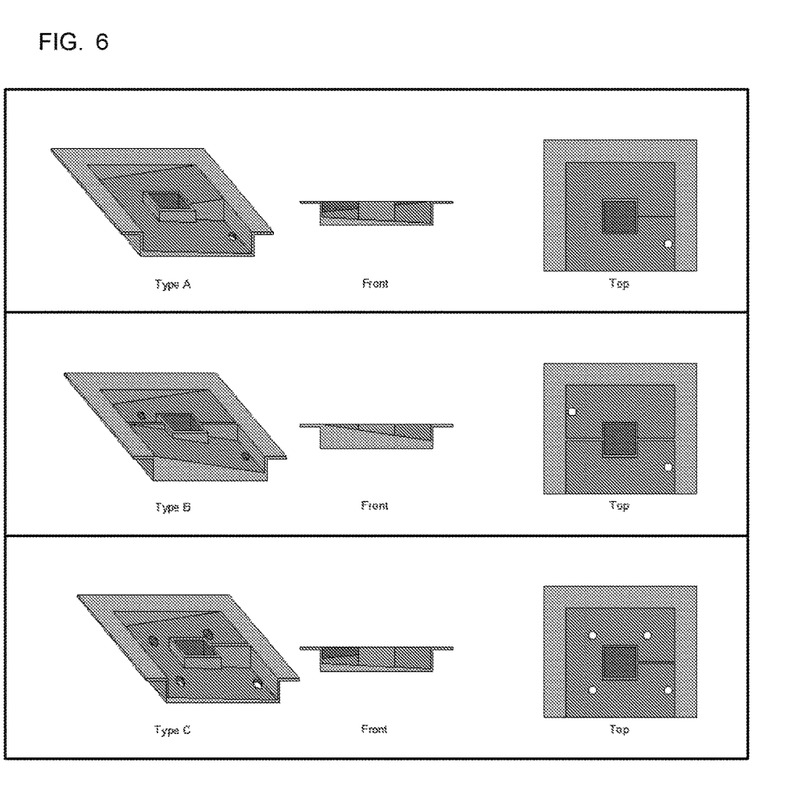

FIG. 6 shows the variations of the drain tray drainage structure of the multi-level apartment type three dimensional water tank. Type A has one drain hole and the drip tray bottom frame is formed with an inclination in top, bottom, left or right direction helping culture water to be discharged circulating around the filtration tank in the middle.

Type B, having two drain holes, is divided with a partition built on a lateral surface of a drain hole with a filtration tank in the middle, so that the interior space of the drip tray can be divided into upper and lower, and left and right blocks. Each block has an inclination in a direction identical to the direction in which the partition is formed and a drain hole is formed at the bottom of the drip tray at the end of the inclination for culture water to drain by the force of gravity. Since the inclination of Type B is larger than that of Type A, Type B is more suitable for water tanks requiring quick drainage or for when there is vast amount of culture water.

Type C has an inclination frame identical to that of Type A, wherein 4 drain holes are formed in upper, lower, left and right directions at the bottom of the drip tray. Type C can prohibit culture water from guttering outside of the drip tray in case that the amount of culture water collected in the drip tray is more than the amount of culture water to drain through the drain hole.

The connecting plate (20) is composed of a plate-like vertical frame and horizontal frame, in which the horizontal frame of the connecting plate is connected to the drip tray and the vertical frame is connected to the water discharging part shelf (15) so as to function as a connection medium of two components stated above. The water discharging part shelf (15) is connected to the vertical frame of the connecting plate in parallel. On the upper surface of the water discharging part shelf, a space for receiving a plurality of modular glass water tanks is generated and on the lower surface of the water discharging part shelf, an LED lighting may be installed to supply lighting source to each water tank. At the periphery of four surfaces of the water discharging part shelf, a bump is formed at a higher height than the upper surface to prevent the glass water tank from slipping out of the water discharging part shelf.

Figure 7:
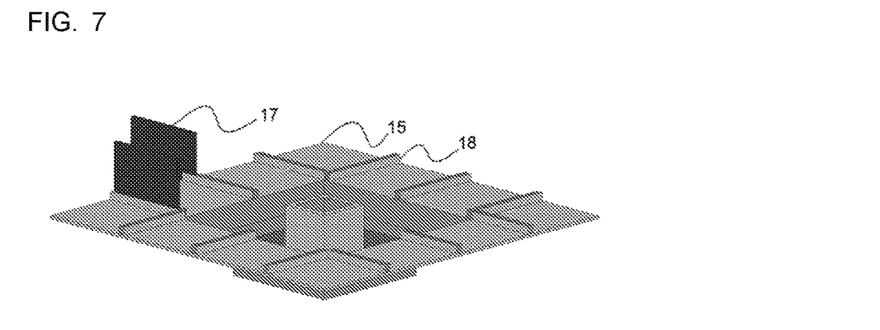

FIG. 7 shows a shelf brace of the water discharging part of the multi-level apartment type three dimensional water tank. As shown in FIG. 7, a shelf brace may be installed in the space between mounted glass water tanks. The shelf brace increases the clamping force between the glass tank and the water discharging part shelf (15), and forms compartments in the space where modular glass water tanks are mounted, wherein an engagement unit recessed from the upper surface of the shelf brace is fixated with an isolation wall (17), so as to block a gap between each of the opposing glass tank wall.

The present modular glass water tank is formed of a transparent acrylic or glass material for the fish held in an water tank and fish held in another tank to recognize each other, causing learning effect from each other. In case that when male and female fish species are housed together in a tank with a mating purpose, and when the fish held in another tank facing the tank is superior so that the mating can be interfered, it is possible to block between those tanks by means of installation of an isolation wall for the fish not to recognize each other beyond the isolation wall.

LED lighting installed on the lower surface of the water discharging part shelf is connected to an LED timer of a system control part so as to supply lighting sources to each water tank and control the lighting sources. The lighting source supplied to the water tank is generally obtained by installation of light-emitting diode, semiconductor type of conventional LED. With a recent development of blue light-emitting diode, the entire wavelength of visible light can be freely expressed along with existing white, orange, violet-blue, green, red, etc.

By lighting an LED light source, fish may overcome stress in response to a specific light source which stimulates its endocrine operation, achieving the effect of lowering the initial death rate. With green and blue LED light source, an fast growth of fish species can be induced in a short time period, while enhancing the interior design.

Figure 8:
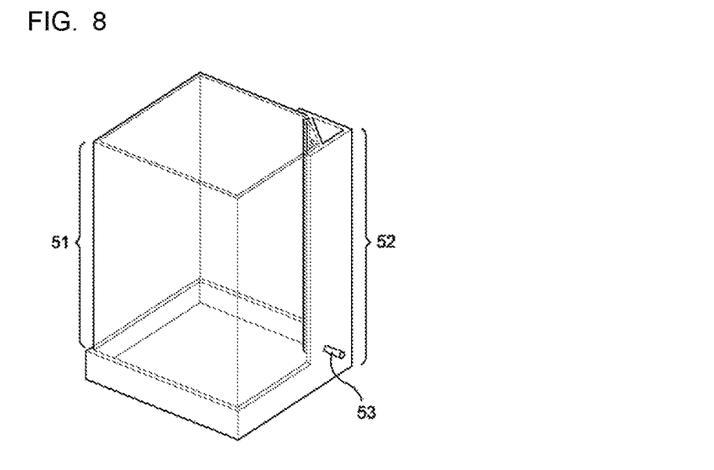

FIG. 8 shows a photo of a glass water tank of the multi-level apartment type three dimensional water tank. The present modular water tank (50) comprises: a water tank body having an upper opening, and a bottom part with a predetermined area, and a polygonally shaped water tank outer wall; a filter retainer mounted on an edge of an inner surface of the water tank outer wall; a drain-through hole connected to a water tank drainage apparatus for water tanks formed on a surface of the water tank outer wall; and a water discharging line formed at the outer portion of the drain-through hole.

Figure 9:
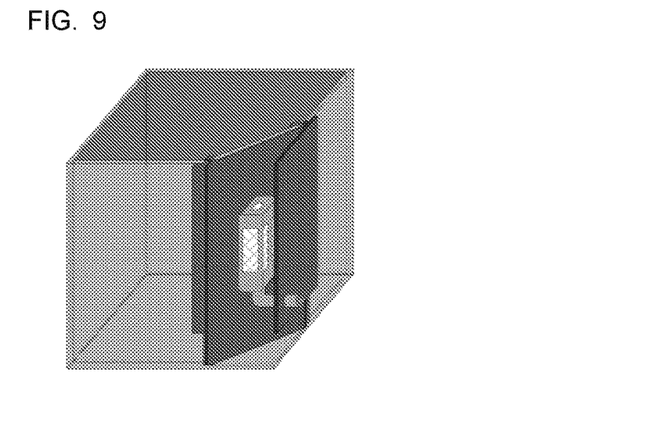

FIG. 9 is a perspective view of a glass water tank of the multi-level apartment type three dimensional water tank. The water tank body (51) is composed of a bottom part with a predetermined area and a polygonal water tank outer wall to accommodate the fish species, wherein from the open top portion, the fish species can be received or caught into the water tank body and required feed and oxygen can be supplied into the culture water. In addition, since the water tank body is made of polymer compounds such as glass, polyethylene, polypropylene, etc, the culture process can be easily observed from the outside.

On one of the corners where outer walls of the water tank body meet, in either a bottom surface or outer wall of the water tank, a penetration hole is formed and a water discharging line (53) is formed in the penetration hole in a pipe shape, in order to discharge culture water needed to be purified to the outside of the glass water tank.

Since the glass water tank unit according to the present invention is made of glass or polymer compounds, it is impossible to process a drain-through hole formed on the bottom or the outer wall of the water tank and to configure the groove around the periphery of the drainage-through hole in a uniform thickness. Thus a double water drainage apparatus for glass or synthetic resin water tanks can be mounted on a penetration hole of the drain-through hole.

The double drainage apparatus comprises a water level control pipe, and a water discharging pipe surrounding the outer surface with a predetermined distance with the water level control pipe at the lower end of the water level control pipe.

The interior bottom surface of the outer water discharging pipe in connection with a water level control pipe of the double water drainage apparatus is sealed, and a penetration hole for controlling culture water is formed on a portion of the body of the water discharging pipe, in order to stabilize culture water level in the water tank. That is, the culture water can be periodically exchanged by continuously supplying the constant flow rate of culture water from the culture water inlet into water tanks and discharging culture water through the water level control pipe.

Figure 10:
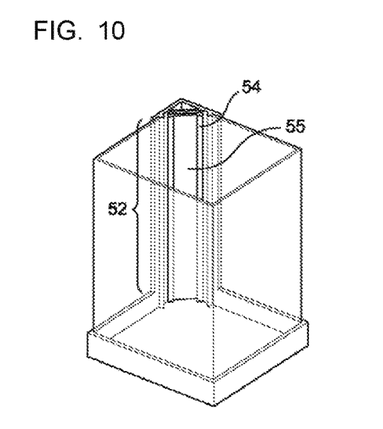

FIG. 10 shows a filtration apparatus of the multi-level apartment type three dimensional water tank. The filtration apparatus (52) is provided at the interior surface of the two outer walls constituting the edge on the water tank body surface respectively. The filtration apparatus is composed of a filter retainer which holds a filtration filter and the filtration filter which sieves foreign materials contained in culture water and prohibits cultured species from flowing in through the water discharging line in an engagement with the filter retainer.

Figure 11:
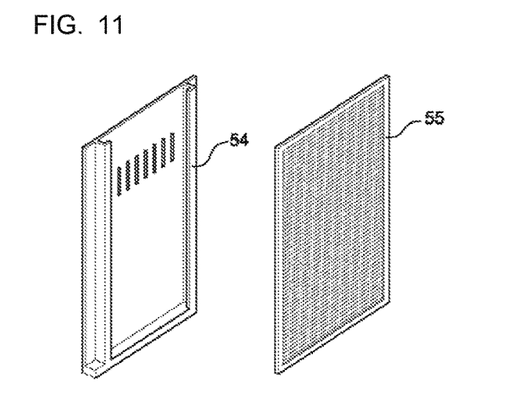

FIG. 11 shows a filtration filter and a filter retainer of the multi-level apartment type three dimensional water tank. The filter retainer (54) is formed in each inner portion of the outer wall of the water tank with a certain distance away from the tank outer wall corner, maximizing a breeding space of juveniles or larvae. In addition, the filter retainer according to the present invention can be modified in an appropriate shape to have a filtration filter thereon. As a preferred embodiment of the invention, a "ㄷ" shaped fitting groove is configured to have a thickness of a filtration filter in the filter retainer, so as to slidably secure a filtration filter on the filter retainer in a top-down direction.

When the filtration filter (55) is mounted on the filter retainer, the water discharging line is surrounded by the water tank outer wall and the filtration filter, allowing the culture water to be purified through the filtration filter before being discharged. In addition, when a water level control pipe is installed, foreign material is led to the water level control pipe, which prevents cultured species from flowing into the water discharging line and clogging the drain hole.

The filtration filter according to the present invention can be mounted with different filter media depending on the purpose and purification effect thereof, and the filter replacement is very easy when the filter is expired. The filter media constituting the filtration filter is generally a filtering means made of porous solid particles such as sand or gravel, activated carbon, etc. and a liquid filtering means such as fiber filters consisting of a nonwoven fabric or sponge. In an embodiment of the present invention, neck-type filtering net and filtering cotton are used. The neck-type filtering net may be changed readily to a desired diameter, and the filtering cotton can be transformed depending on the strength of the material in several steps.

Figure 12:
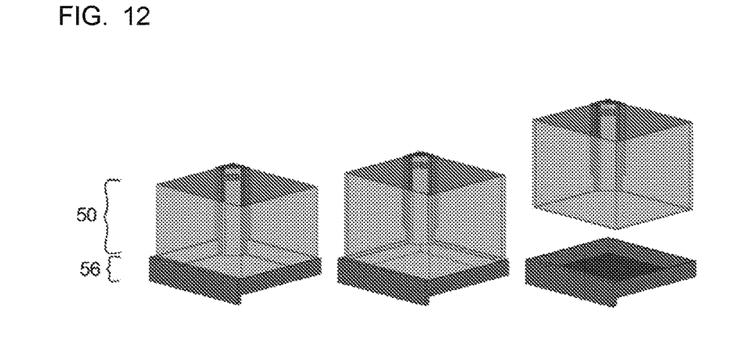

FIG. 12 is a perspective view of a glass water tank mounted with a water tank sill support of the multi-level apartment type three dimensional water tank. A multi-level apartment type three-dimensional water tank is characterized in that one or more than one modular structures as horizontal members are stacked surrounding four surfaces of a vertical member, the vertical member composed of a hollow polygonal frame which is open in the upper and lower part; that one or more than one modular water tanks are mounted on the horizontal members in front, back, left and right surfaces with the vertical member in the middle; and that a system controller is installed on the upper opening part of the polygonal frame.

Since the glass water tank is formed of a synthetic resin, such as glass or acrylic, the friction force of a bottom surface where modular glass water tanks are installed is fragile. And because multiple modular water tanks are mounted in a form surrounding the edge of the three dimensional water tank, the water tanks can be damaged by sliding. Therefore, a water tank sill support is added on the lower part of the glass water tank (50) to increase holding force of the glass tank mounted on the three dimensional water tank by engaging the lower part of the glass water tanks in each layer into the recessed groove on the water tank sill support, so that the modular glass water tanks installed on the upper surface of the horizontal member of the water discharging part shelf can be stabilized in a predetermined location. The water tank sill support (56) is generally open in the upper part and has a polygonal structure of a predetermined frame. The upper open part is formed in a size capable of accommodating the lower part of the glass water tank and may be made of solid material like plastic which is light and does not change with moisture.

The water tank sill support, as shown in FIG. 5, may be structured both in a detachable engagement with the modular water tank and in an integral engagement with the modular water tank. By coating the upper surface and lower surface of the water tank sill support with silicon or rubber material, slipping that may occur by contact between the water sill support and the water tank can be prevented.

Figure 13:
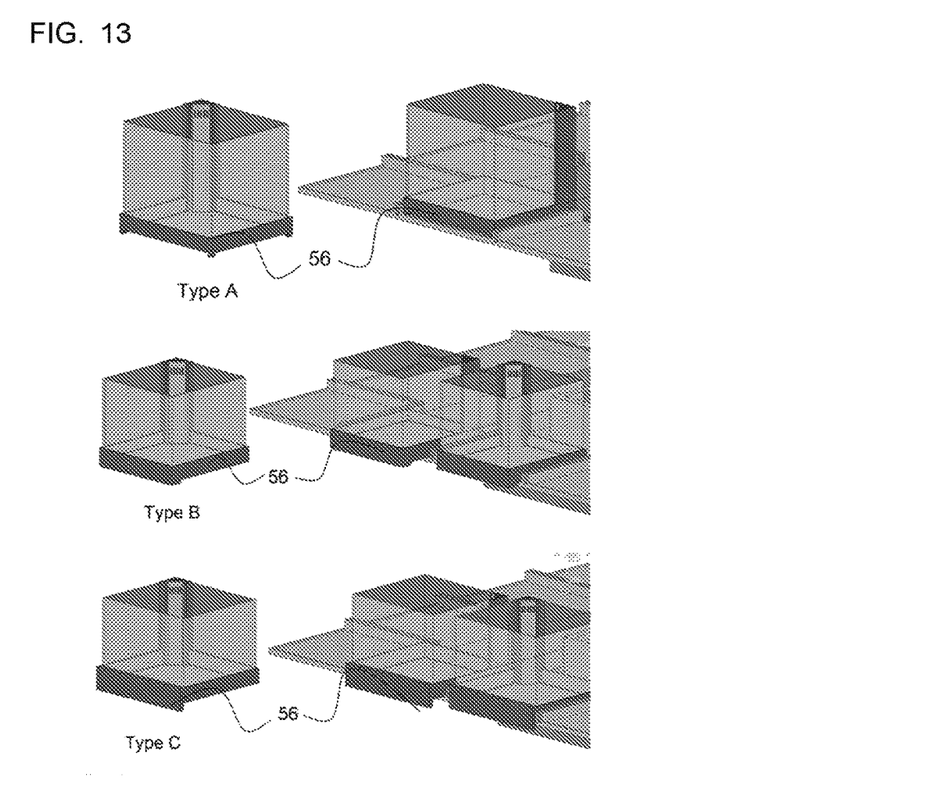

FIG. 13 shows a water tank sill support of the multi-level apartment type three dimensional water tank. The frame of the water tank sill support can be modified in various ways, depending on the purpose for joining the lower surface and bumps in the horizontal member.

Figure 14:
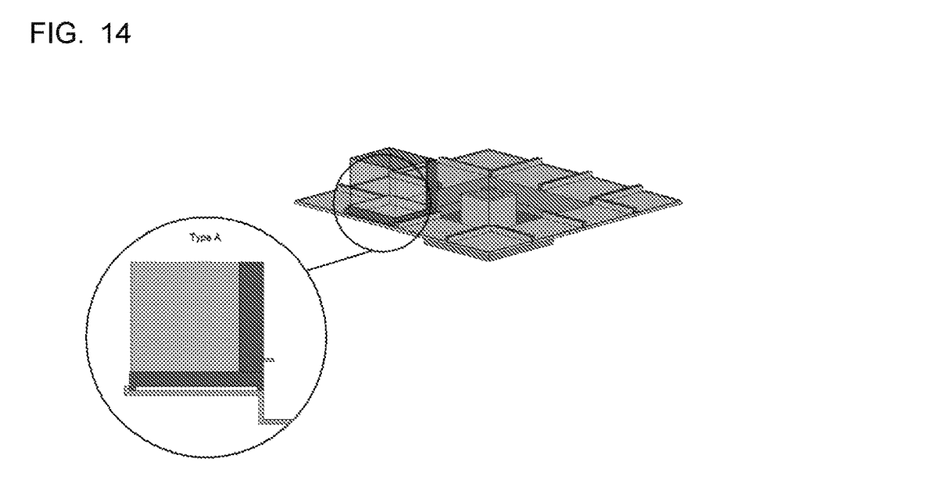

FIG. 14 shows a Type A which is a variation of the water tank sill support of the multi-level apartment type three dimensional water tank. In Type A, a frame with protrusions is formed in the bottom corner. Thus when a modular water tank is mounted on the water tank sill support, the center of gravity is concentrated on the four protrusions, to thereby increase the fixing force of the water discharging part shelf and the water tank. By means of protrusions on the bottom corner, the lower surfaces of the horizontal member and the water tank sill support are allowed to have a space as deep as the height of the protrusions, facilitating cleaning and water discharge management.

Figure 15:
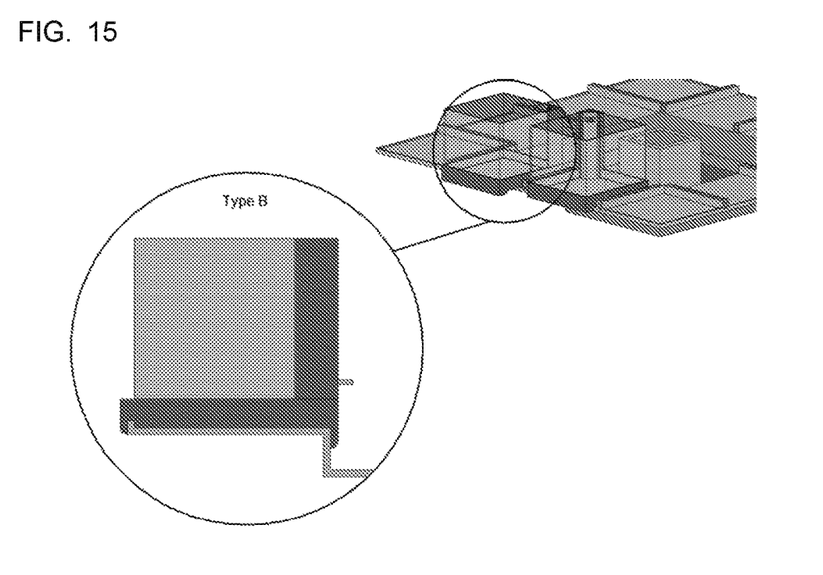

FIG. 15 shows a Type B which is a variation of the water tank sill support of the multi-level apartment type three dimensional water tank. In Type B, any one surface of the water tank sill support surrounds the bump of the horizontal member for the surface to protrude downward from the bump. With this configuration, the lower surface of the water sill support except for the protruded frame is fixedly mounted. Therefore, water tanks can be easily separated or mounted by pulling the water tank sill support like a handle of a drawer.

Figure 16:
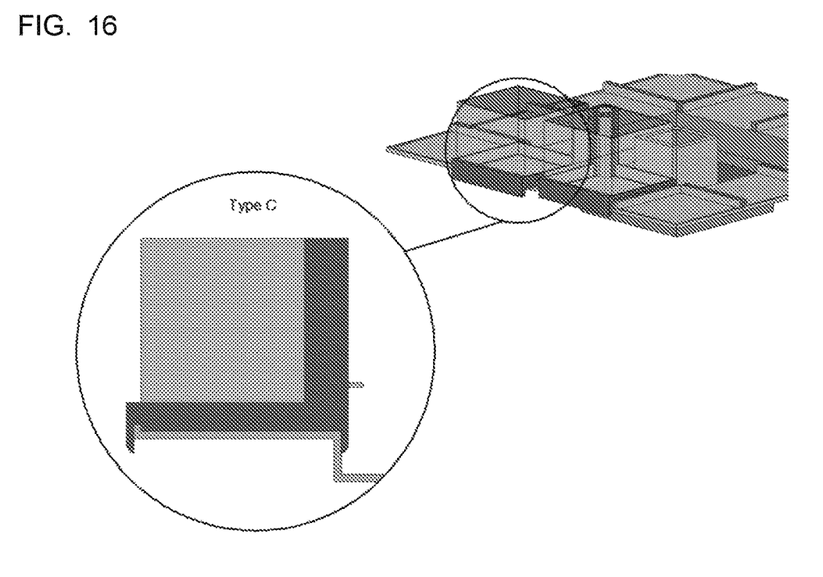

FIG. 16 shows a Type C which is a variation of the water tank sill support of the multi-level apartment type three dimensional water tank. In Type C, a surface of the water tank sill support has a concave groove to surround the bump of the horizontal member and is fixed in engagement with the bump, and the opposite surface has a protruding frame so as to protrude to the lower side of the rear surface of the horizontal member to be fixed in connection. In addition, on one surface of the water sill support, a projected frame higher than the lower surface is formed and a part of the lower surface in contact with the water discharge part shelf is formed with a groove in a size corresponding to the bump formed on the water discharging part shelf, to thereby increase the clamping force between the water discharge part shelf and modular glass water tanks.

Figure 17:
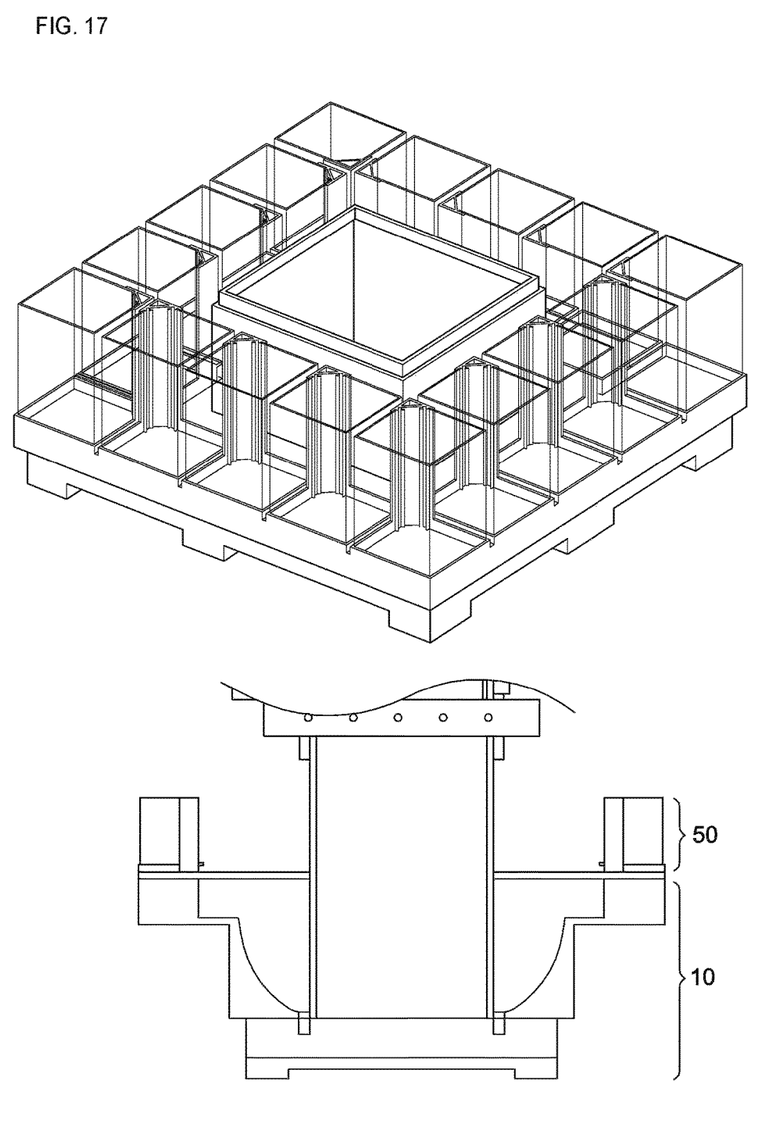

FIG. 17 is an overall perspective view and a cross-sectional view of a unit of the multi-level apartment type three dimensional water tank. In a preferred embodiment, a glass water tank is fixated on the upper surface of the water discharge part shelf and it is adequate to install the filtration filter of the glass water tank in a direction where the filtration tank is formed. By doing this, the culture water discharged from water discharging line and then, collected in a drip tray can be easily transferred to the drain hole formed on the drip tray.

Since the water discharging part is formed in a multi-layer structure, a recessed space, open in the upper part is formed in the drip tray. Culture water discharged through the water discharging line of modular glass water tanks is transferred to the drip tray while generating a head to the connecting plate by gravity, so that culture water of a predetermined amount can be collected in the drip tray.

Culture water discharged from each modular water tank (50) for breeding fish species is supplied to an aquaponics culture tank in the water discharge part, wherein the amount of the culture water is adjusted through a main reservoir valve mounted on main reservoir line. The aquaponics culture tank is provided with a solid culture medium filter media for plant breeding, and also provided with a double water drainage apparatus for water level adjustment to thereby automatically supply culture water purified in the aquaponics culture tank through a drain hole to the filtration tank, facilitating circulation environment filtration. By means of this filtering method, culture water eutrophicated with organic materials arising from culture species can be purified without the process of biological or physical filtration.

In general, since cultured fish species digest and excrete approximately 60-70% of ingredients in the feed, the culture water used for fish breeding not only contains a variety of organic materials, but also contains relatively high dissolved oxygen, because it is in contact with oxygen while causing a head on the connecting plate when discharged. So the culture water can be in optimal condition for being supplied to the plant.

For hydroponic cultivation of vegetables, nutrients such as Ca, Mg, K, N, P, S, Cl, Fe, Mn, Cu, Zn, B, Mo, etc. are required and the culture water discharged from the water tank contain most of those nutrients. So in consideration of the components in the culture water depending on the cultured species, the target plants can be selected and combined.

Culture water discharged from the aquaponics culture tank is supplied into a main reservoir after passing through membrane filtration and a sedimentation tank via a circulation pump, to be supplied to a modular water tank (50).

The double drainage apparatus comprises a water level control pipe, and a water discharging pipe surrounding the outer surface with a predetermined distance with the water level control pipe at the lower end of the water level control pipe.

The interior bottom surface of the outer water discharging pipe in connection with a water level control pipe of the double water drainage apparatus is sealed, and a penetration hole for controlling culture water is formed on a portion of the body of the water discharging pipe, in order to stabilize culture water level in the water tank. That is, the culture water can be periodically exchanged by continuously supplying the constant flow rate of culture water from the culture water inlet into water tanks and discharging culture water through the water level control pipe.

The aquaponics system according to the present invention may be configured with a purpose of efficiently using the culture water such that a solid culture medium filter media and filtering cotton are laid in a recessed space on the drip tray to grow aquatic plants. Solid culture medium made of Peat moss, perlite, vermiculite, rockwool, pumice, manure, sawdust, gravel, sand, etc is used for artificially creating an environment where plants grow.

In the aquaponics system according to the present invention, by supplying various organic matters contained in the culture water in the water tank for fish farming to the plants, the organic matters in the culture water can be recycled in an ecofriendly manner, facilitating production of ecofriendly agricultural products. In addition, the culture water purified in the above process, can be supplied back to the water tank for fish farming. As a result, mass production of ecofriendly agricultural products becomes available and purification cost for culture water in fish farms can be reduced.

Figure 18:
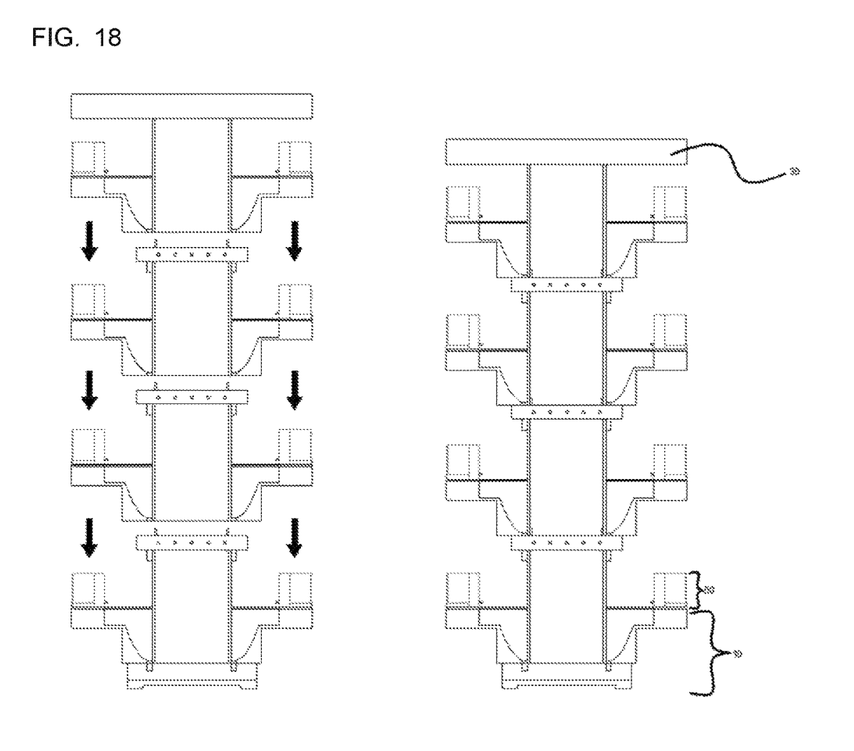

FIG. 18 shows a principle of multi-layer combination of a structure unit of the multi-level apartment type three dimensional water tank. On the three dimensional water tank according to the present invention, it is possible to mount a plurality of modular water tanks in a multi-level structure, facilitating adjustment of the overall height, adjustment of the required number of glass water tanks in each layer, and control of each respective layer by means of a system controller.

On the top surface of the main reservoir of a structure unit of the present multi-level apartment type water tank which is mounted in the first level, a projection with a diameter that can be accommodated in the filtration tank diameter which is formed on the second level upon the first level is formed, to thereby obtaining the multi-level apartment type water tank. The top layer of the structure unit of the multi-level apartment type water tank is provided with a system controller including CPU and memory to control the environment inside the water tanks in each layer entirely or partially and also control LED lighting therein.

With regard to the discharge system of the aquaponics culture system of the present multi-level apartment type water tank, culture water supplied to each modular glass water tank is supplied to a main reservoir line through a filtration tank and a motor pump in connection with the filtration tank. When a user adjusts a control switch on the system controller, the input amount of culture water to each modular water tank and the amount of flow rate are transferred to a system controller (30) through a main reservoir line in the main reservoir.

If a user enters the amount and flow rate of the culture water through a control switch on the system controller, the culture water moves into the main reservoir according the input conditions, and is supplied to each modular water tank through a main reservoir line installed on the main reservoir.

And by installing a CPU controller in each respective layer, each layer can be independently controlled.

In general, in order to discharge culture water from modular glass water tanks, a water level control pipe may be installed in a modular glass water tank from which the culture water is discharged when the water level reaches to a predetermined level, to thereby constantly provide an adequate amount of culture water for plants grown in a drip tray.

The culture water needed to be purified in water tanks is discharged to the outside of the glass water tank through a water discharging line and moves to the connecting plate by gravity while generating head drop. The culture water gathered in the drip tray is transferred to a filtration tank through the water discharge line formed at the bottom of the drip tray and then discharged toward the outside or purified to be supplied back to the glass water tanks.

In the present multi-level apartment type three dimensional water tank where a plurality of modular glass water tanks are installed on all four sides of front, rear, left and right directions in multi-layer structure facilitating intensive breeding of fish species, a water tank sill support is mounted on a lower surface of a glass water tank, increasing the clamping force between the surface on which the water tank is mounted and the water tank to be mounted thereon to thereby prevent the glass water tank from being damaged even in a small impact. Thus a plurality of modular glass water tanks can be safely established in a limited space, enabling target fish species to be cultured in an appropriate environment for each species while decreasing production cost and maximizing production efficiency.

The present multi-level apartment type water tank solves a problem such that the glass water tanks made from glass or synthetic resin such as acryl can break due to slipping, which is caused by weak frictional force between the modular glass water tank and a bottom surface on which the modular glass water tank is provided, and facilitates the installation and separation of the three dimensional water tank and each glass water tank. The present water tank also makes it possible to recycle into nutritional contents needed for the growth of plants, organic and inorganic substances present as sources of pollution in culture water which are generated when fish is cultured, so as to decompose eutrophic substances interrupting the cultivation of fish in a plant cultivation step, thereby absorbing the decomposed substances as nutrients. Overall, the present multi-level apartment type three-dimensional water tank filtrates and purifies culture water in ecofriendly manner and helps establish an yearly sustainable organic agricultural product and fishery product production and supply system without locational and geographical limitations.

REFERENCE NUMERALS

10: a structure unit, 11: a water discharging part, 12: a main reservoir, 13: a filtration tank 14: a main reservoir line, 15: a water discharge part shelf, 16: a drip tray, 17: an isolation wall, 18: a shelf brace 19: a drain hole, 20: a connecting plate, 30: a system controller, 50: a glass water tank, 51: a water tank body 52: a filter filtration apparatus, 53: a water discharging line, 53: a filter retainer, 55: a filtration filter 56: a water tank sill support In the present multi-level apartment type three dimensional water tank, a plurality of modular glass water tanks are installed on all four sides of front, rear, left and right directions in multi-layer structure, facilitating intensive breeding of fish species in a limited space, separate accommodation of each different species, and a focused breeding on target organisms by means of a system controller which automatically controls the environmental condition in each water tank and the condition for providing culture water, thereby decreasing production cost and maximizing production efficiency.

What is claimed is:

1. A multi-level apartment type three-dimensional water tank, characterized in that: one or more than one modular structures composed of horizontal members are stacked surrounding four surfaces of a vertical member, the vertical member composed of a hollow polygonal frame which is open in the upper and lower part; one or more than one modular water tanks are mounted on the horizontal members in front, back, left and right surfaces with the vertical member in the middle; and a system controller is installed on the upper opening part of the polygonal frame, wherein the modular water tank comprises: a water tank body having an upper opening, and a bottom part with a predetermined area, and a polygonally shaped water tank outer wall; a filter retainer mounted on an edge of an inner surface of the water tank outer wall; a drain-through hole connected to a water tank drainage apparatus for water tanks formed on a surface of the water tank outer wall; and a water discharging line formed at the outer portion of the drain-through hole, and wherein a water tank drainage apparatus is connected to a drainage-through hole inside the water tank via a water level control pipe, and is formed with a drain pipe surrounding the outer surface of the water level control pipe with a predetermined distance with the water level control pipe, in which the bottom surface of the drain pipe is sealed and through holes are formed on a part of the drain pipe body for adjusting culture water on a partial portion of the drain pipe body.

2. The multi-level apartment type three-dimensional water tank according to claim 1, wherein a filtration filter is detachably mounted in the filter retainer and each surface of the modular water tank is composed of a transparent material.

3. A multi-level apartment type three-dimensional water tank, characterized in that: a vertical member composed of a polygonal frame open in the upper and lower parts thereof and a water discharging part are assembled in one or more than one layers; one or more than one modular water tanks are mounted on the water discharging part in front, back, left and right surfaces with the vertical member in the middle; and a system controller is installed on the upper opening part of the polygonal frame, wherein a main reservoir for supplying culture water to modular water tanks is formed in the upper part of the vertical member composed of a polygonal frame and a main reservoir line including a flow meter measuring flux flow of culture water and water exchange rate is installed on the main reservoir.

4. The multi-level apartment type three-dimensional water tank according to claim 3, wherein the water discharging part comprises an open upper part having a plate-shaped horizontal frame and vertical frame engaged therewith connected surrounding the vertical member, and a concave lower part so as to have a stair-shaped form which is wide in the upper part and narrow in the lower part.

5. The multi-level apartment type three-dimensional water tank according to claim 4, wherein a space having a concave lower part formed on a stair-shaped water discharging part which is wide in the upper part and narrow in the lower part is used for aquaponics culture system, wherein the space having a concave lower part of the water discharging part is formed with solid culture medium filter media for sowing plant seeds and growing thereon.

6. The multi-level apartment type three-dimensional water tank according to claim 5, wherein the bottom part of the water discharging part is inclined toward a drain hole with 1-5 degree gradient.

7. The multi-level apartment type three-dimensional water tank according to claim 3, wherein culture water supplied into the modular water tanks is transferred to the water discharging part, passing through a water discharging line, and supplied as culture water in the water reservoir.

8. The multi-level apartment type three-dimensional water tank according to claim 3, wherein a water tank sill support is additionally engaged on the lower part of the modular water tank, the water tank sill support having an open upper part and a predetermined depth to accommodate the modular water tank.

9. The multi-level apartment type three-dimensional water tank according to claim 8, wherein a protrusion-type frame is formed on a lower edge surface of the water tank sill support.

10. The multi-level apartment type three-dimensional water tank according to claim 8, wherein a surface of the water tank sill support has a concave groove to surround the bump of the horizontal member and is fixed in engagement with the bump; the opposite surface has a protruding frame so as to protrude toward the lower side of the rear surface of the horizontal member to be fixed in connection.

11. The multi-level apartment type three-dimensional water tank according to claim 8, wherein a drawer-type pulling handle is formed in which, for a surface of a water tank sill support to wrap a bump of the horizontal member, a protruding frame is formed protruding toward a lower surface of the bump.

12. The multi-level apartment type three-dimensional water tank according to claim 3, wherein a bump of a predetermined height is formed on an outer edge of the upper surface of the horizontal member where modular water tanks are mounted, so that the modular water tank is stably mounted inside of the bump without slipping out of the horizontal member.

13. The multi-level apartment type three-dimensional water tank according to claim 3, wherein the modular water tank comprises: a water tank body having an upper opening, and a bottom part with a predetermined area, and a polygonally shaped water tank outer wall; a filter retainer mounted on an edge of an inner surface of the water tank outer wall; a drain-through hole connected to a water tank drainage apparatus for water tanks formed on a surface of the water tank outer wall; and a water discharging line formed at the outer portion of the drain-through hole.

14. A multi-level apartment type three-dimensional water tank, characterized in that: a vertical member composed of a polygonal frame open in the upper and lower parts thereof and a water discharging part are assembled in one or more than one layers; one or more than one modular water tanks are mounted on the water discharging part in front, back, left and right surfaces with the vertical member in the middle; and a system controller is installed on the upper opening part of the polygonal frame, wherein a shelf brace is installed on the upper surface of a water discharging part shelf, an engaging groove is formed on the upper surface of the shelf brace to fix an isolation wall, and an LED lighting is installed on the lower surface of the shelf brace.

* * * * *